US012623219B2

(12) United States Patent
Wu et al.

(10) Patent No.: US 12,623,219 B2
(45) Date of Patent: May 12, 2026

(54) DRIVING CIRCUIT FOR ELECTROWETTING-ON-DIELECTRIC (EWOD) PIXEL AND EWOD SYSTEM USING THE SAME

(71) Applicant: CYTESI, INC., Menlo Park, CA (US)

(72) Inventors: Tung-Yu Wu, Hsinchu City (TW); Chung-Yi Wang, Zhubei City (TW); Tang-Hung Po, Zhubei City (TW)

(73) Assignee: CYTESI, INC., Menlo Park, CA (US)

( * ) Notice: Subject to any disclaimer, the term of this patent is extended or adjusted under 35 U.S.C. 154(b) by 543 days.

(21) Appl. No.: 18/092,656

(22) Filed: Jan. 3, 2023

(65) Prior Publication Data

US 2023/0221543 A1     Jul. 13, 2023

Related U.S. Application Data

(60) Provisional application No. 63/299,244, filed on Jan. 13, 2022.

(51) Int. Cl.
*G02B 26/00* (2006.01)
*B01L 3/00* (2006.01)

(52) U.S. Cl.
CPC ........ *B01L 3/50273* (2013.01); *G02B 26/005* (2013.01); *B01L 2400/0427* (2013.01)

(58) Field of Classification Search
CPC ... G02B 26/004; G02B 26/005; B01L 3/5027; B01L 3/50273; B01L 2400/0415; B01L 2400/0427
See application file for complete search history.

(56) References Cited

U.S. PATENT DOCUMENTS

| | | | | |
|---|---|---|---|---|
| 2012/0268804 A1* | 10/2012 | Hadwen | ............ | B01L 3/502792 |
| | | | | 359/290 |
| 2013/0062205 A1* | 3/2013 | Hadwen | ............ | B01L 3/502784 |
| | | | | 204/601 |

FOREIGN PATENT DOCUMENTS

EP          2614892 B1 *   6/2018   .......... B01L 3/50273

* cited by examiner

*Primary Examiner* — Douglas X Rodriguez
*Assistant Examiner* — Kendrick X Liu
(74) *Attorney, Agent, or Firm* — BACON & THOMAS, PLLC

(57) ABSTRACT

A driving circuit for an electrowetting on dielectric (EWOD) pixel. The driving circuit includes a latch circuit for transmitting a source data pulse to a storage capacitor in response to an activation gate signal applied to the gate of the switch transistor and generating a latch voltage and an inversion circuit for outputting a driving voltage at either a first power voltage or a second power voltage based on the latch voltage generated by the latch circuit.

3 Claims, 16 Drawing Sheets

C1          C2          C3          104          100

106

10

$V_{COM}$

CST

$V_{COM}$

112

110

VP1          VP2          VP3

Frame=VP1,VP2,VP3,$V_{COM}$

$V_{COM} = -15V$

112

110

VP1=0V  VP2=+15V  VP3=0V

Vdiff=+15V $V_{COM} = +15V$

112

110

VP1=+15V  VP2=+15V  VP3=+15V

Vdiff=0V

1910

1920

DRIVING CIRCUIT FOR ELECTROWETTING-ON-DIELECTRIC (EWOD) PIXEL AND EWOD SYSTEM USING THE SAME

CROSS-REFERENCE

This application claims the benefit of U.S. Provisional Patent Application No. 63/299,244, filed Jan. 13, 2022, which application is incorporated by reference in its entirety.

TECHNICAL FIELD

The present disclosure relates to a driving circuit that drives a data line and an Electrowetting-On-Dielectric (EWOD) system having the driving circuit.

BACKGROUND

Electrowetting-On-Dielectric (EWOD) is a known technique for manipulating droplets of fluid on an array. The motion of the droplets is initiated and controlled by electrowetting through an application of an electric field between a droplet and a drive electrode electrically insulated from the droplet by a dielectric layer. Accordingly, the electric field therebetween should be sufficiently great as to move the droplet. However, when a constant voltage is applied, the dielectric layer is susceptible to polarization, ultimately the electrowetting effect completely vanishes. Accordingly, an approach of applying an alternative current (AC) pulse of greater than 30 volts (V) to the drive electrode is proposed as to move the droplet and prevent the dielectric layer from polarization.

FIG. 1 shows a diagrammatic cross-section of a portion of an example traditional EWOD device 100. The EWOD device 100 includes first and second substrates 102, 104 spaced apart to form a cavity 106 in which a droplet 10 is constrained. The first and second substrates 102, 104 may take the form of glass plates. An array of drive electrodes 108 (e.g., VP1, VP2, VP3) is formed on the first substrate 102. The drive electrodes 108 may be transparent, for example being formed of transparent Indium Tin Oxide (ITO). A dielectric layer 110 is formed over the drive electrodes 108 to provide appropriate dielectric capacitance between the drive electrodes 108 and droplet 10. A ground electrode 112 (e.g., $V_{com}$) is formed on the lower surface of the second substrate 104. The ground electrode 112 may be transparent, for example, being formed of transparent ITO. This allows visual inspection of microfluidic operation. One ground electrode 112 may be associated with one corresponding drive electrode VP1, VP2, or VP3 as to form a respective EWOD pixel C1, C2, or C3 as illustrated in FIG. 1.

To move droplet 10 in a direction indicated by the arrow in FIG. 1, drive electrode VP2 is energized at 30V to attract droplet 10 and cause droplet 10 to move and become centered on drive electrode VP2. Subsequent activation of drive electrode VP3, followed by removal of the voltage potential at drive electrode VP2, cause droplet 10 to move onto drive electrode VP3. This sequencing of biasing these electrodes can be repeated to cause droplet 10 to continue to move in any direction as desired.

In the above scheme, shown in FIG. 1, there are 0V and 30V for drive electrodes 108, however, as dielectric layer 110 always suffers a fixed direction of electric field, dielectric layer 110 is rapidly deteriorated by polarization. Though another approach of biasing ground electrode 112 to 15V has been proposed such that a voltage difference in pixel C1 is $V_{com}$–VP1, i.e., 15V; a voltage difference in pixel C2 is –15V; and a voltage difference in Pixel C3 is 15V. However, in such a scenario, droplet 10 would not be moved, since an absolute value of the voltage differences between any two adjacent EWOD pixels C1, C2 and C3 are the same.

FIG. 2 shows a known circuit 20 of 1 transistor and 1 capacitor (1T1C) for an EWOD pixel which can be used in controlling each individual EWOD pixel in FIG. 1. The circuit 20 consists of a switch transistor SW, and a storage capacitor CST. The switch transistor SW (a TFT) is connected between a matrix source line 24 and a drive electrode 26. A matrix gate line 28 is connected to a gate of transistor SW. The storage capacitor CST is connected between the drive electrode 26 and ground. Ideally, by applying of voltage pulses to the matrix source line 24 and the matrix gate line 28, a voltage VE can be written to the drive electrode 26 and stored in the storage capacitor CST. By appropriate design and operation, different voltages VE may be applied to different electrodes (e.g., drive electrodes VP1, VP2, VP3 and ground electrode 112, respectively). However, in practice, the drive voltage VE across the storage capacitor CST varies when droplet is moved and renders controlling to the pixel unreliable.

SUMMARY OF THE INVENTION

According to one aspect of the invention, a method for driving EWOD device with frame times to diminish the damage caused by polarization of the dielectric layer is provided.

According to another aspect of the invention, the ground electrode is grounded at zero volts. Accordingly, the voltage difference across each pixel is the voltage on the active pixel so that the droplet is attracted to the active pixel.

According to a further aspect of the invention, the ground electrode is supplied with a AC pulse out of phase with the active electrode as to double the voltage difference across the active pixel.

According to a further aspect of the invention, a driving circuit for an EWOD pixel includes a latch circuit formed of a switch transistor and a storage capacitor and an inversion circuit for outputting a driving voltage at either a first power voltage or a second power voltage based on a latch voltage from the latch circuit.

According to a further aspect of the invention, the latch circuit in the driving circuit further includes two serially connected inverters and a switch connected in parallel with the inverters between the switch transistor and the storage capacitor.

According to a further aspect of the invention, the inversion circuit includes two n-channel metal-oxide-semiconductor (NMOS) transistors connected in series between two power voltages and a CMOS inverter connected between a latch output node of the latch circuit and gate of either one of the two NMOS transistors and gate of the other of the two NMOS transistor connected to the latch output node of the latch circuit.

According to a further aspect of the invention, the inversion circuit includes a CMOS inverter formed of a NMOS transistor and a p-channel metal-oxide-semiconductor (PMOS) transistor connected in series between the first power voltage and the second power voltage.

According to a further aspect of the invention, the driving circuit further includes a shifter circuit formed of a cross-coupled pull-up and a differential pair for generating an operative voltage higher than the driving voltage from the inversion circuit.

According to a further aspect of the invention, a circuit arrangement for an active matrix EWOD (AM-EWOD) system is provided. The circuit arrangement includes an M×N array of pixels arranged in M rows and N columns. Each of the pixels includes a driving circuit as described herein. The circuit arrangement further includes M matrix gate lines connected to the gates of N switch transistors in the same rows.

BRIEF DESCRIPTION OF THE DRAWINGS

FIG. 1 is a diagrammatic cross-section of an example conventional EWOD device;

FIG. 2 is a schematic circuit diagram for a conventional pixel with a transistor and a capacitor;

FIG. 3 illustrates an EWOD device operation with a frame time in accordance with an embodiment;

DETAILED DESCRIPTION

Figure 4:
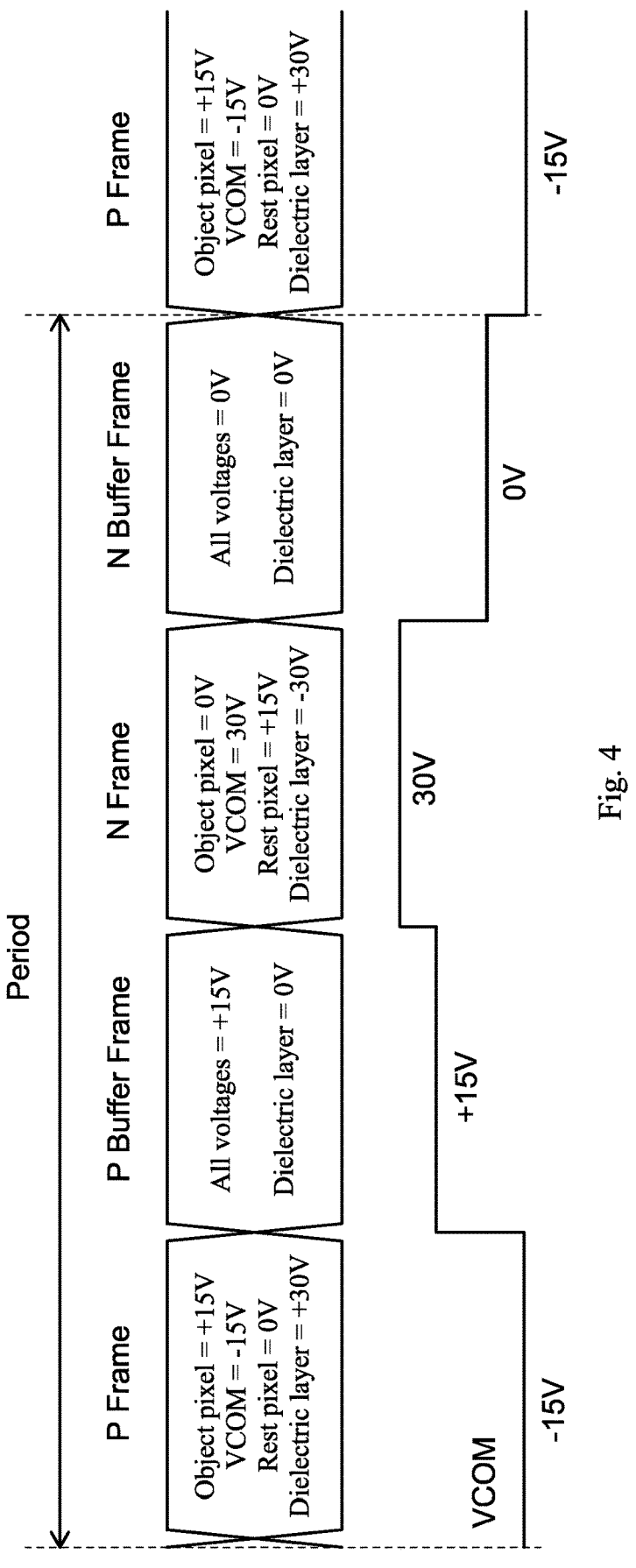
FIG. 4 is a timing diagram for driving the EWOD device of FIG. 3 in accordance with an embodiment.

The embodiments of the present disclosure now will be described more fully hereinafter with reference to the accompanying drawings, in which preferred embodiments of the present disclosure are shown. In the drawings, like references indicate like parts or features.

Figures 1, 2, 3:
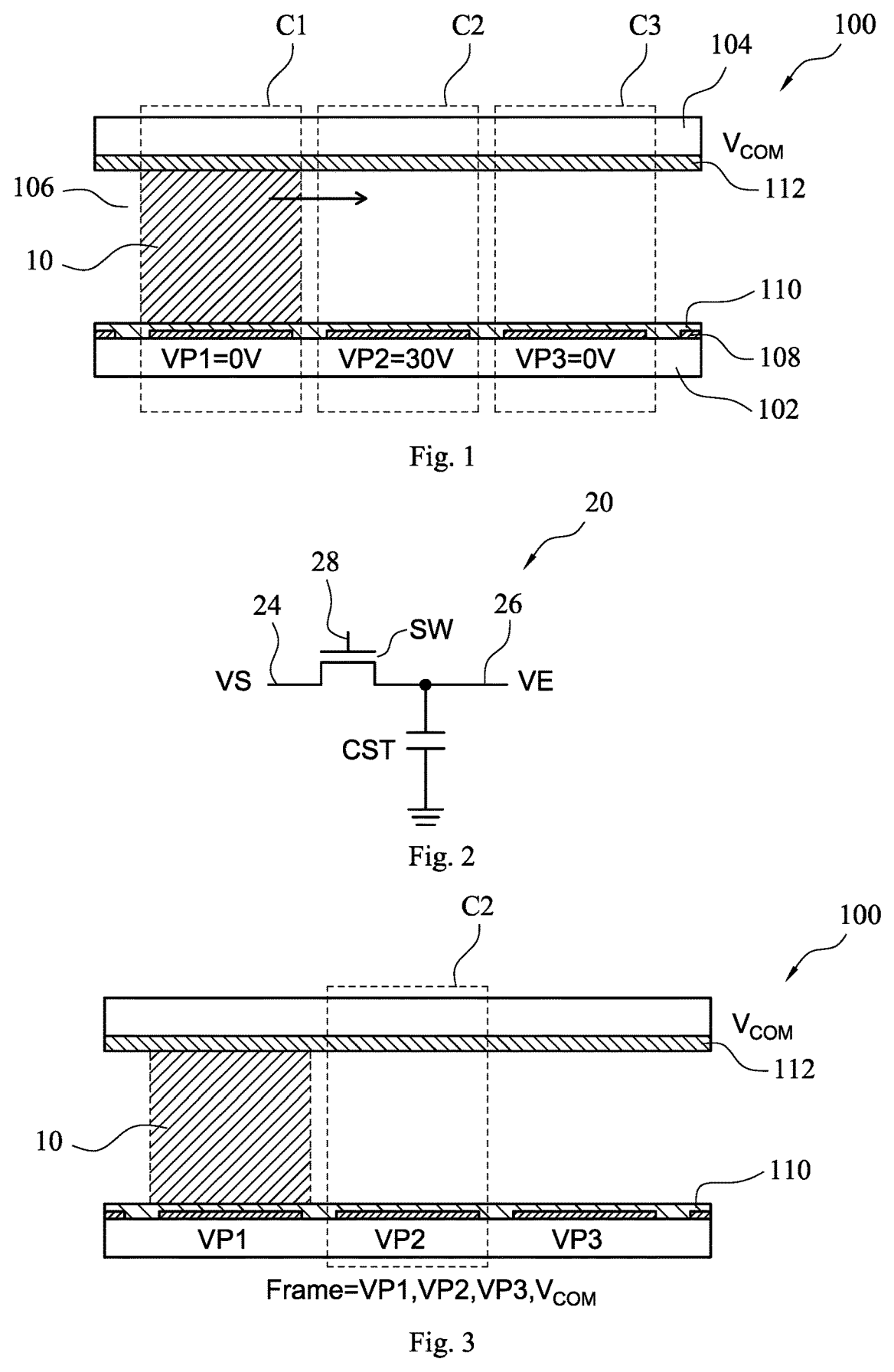

In view of polarization issue in FIG. 1, an EWOD device driven with frame time, i.e., Frame=(VP1, VP2, VP3, Vcom) is proposed in accordance with an embodiment of the present disclosure. There are two "schemes" of driving EWOD device with frame time: "DC voltage" and "AC voltage".

FIG. 3 illustrates EWOD device operating in DC voltage scheme, Frame=(VP1, VP2, VP3, Vcom=DC voltage), where the ground electrode 112 is set to a potential of zero volts and cell C2 is set as an active cell. Then, the following steps may be used:

a) VP1=Vcom, VP2=Vcom+Vdiff, VP3=Vcom, with Vdiff=30V such that droplet 10 is moved from drive electrode VP1 to VP2 and dielectric layer 110 is subjected to 30V.

b) VP1=Vcom, VP2=Vcom−Vdiff, VP3=Vcom, with Vdiff=30V such that droplet 10 is moved from drive electrode VP1 to VP2 and dielectric layer 110 is also subjected to −30V.

When EWOD device 100 is operated by alternatively implementing the steps of a) and b), the potential across dielectric layer 110 would be ±30V, the polarization issue thereof is solved.

In AC voltage scheme, FIG. 4 shows a graphic representation of the timing signals supplied to ground electrode Vcom=AC voltage, and with reference to FIGS. 5A-5D whereby a graphical representation of exemplary droplet 10 moved from cells C1 to C3 is shown in accordance with an embodiment. In AC voltage scheme, i.e., Frame=(VP1, VP2, VP3, Vcom=AC voltage), the potential across dielectric layer 110 is effectively doubled to ±30V by supplying ground electrode 112 with a voltage signal out of phase with active drive electrodes VP1, VP2, VP3 sequentially. As shown in FIG. 4, one period consists of four frames, i.e., P frame, P buffer frame, N frame and N buffer frame.

Figures 5A, 5B:
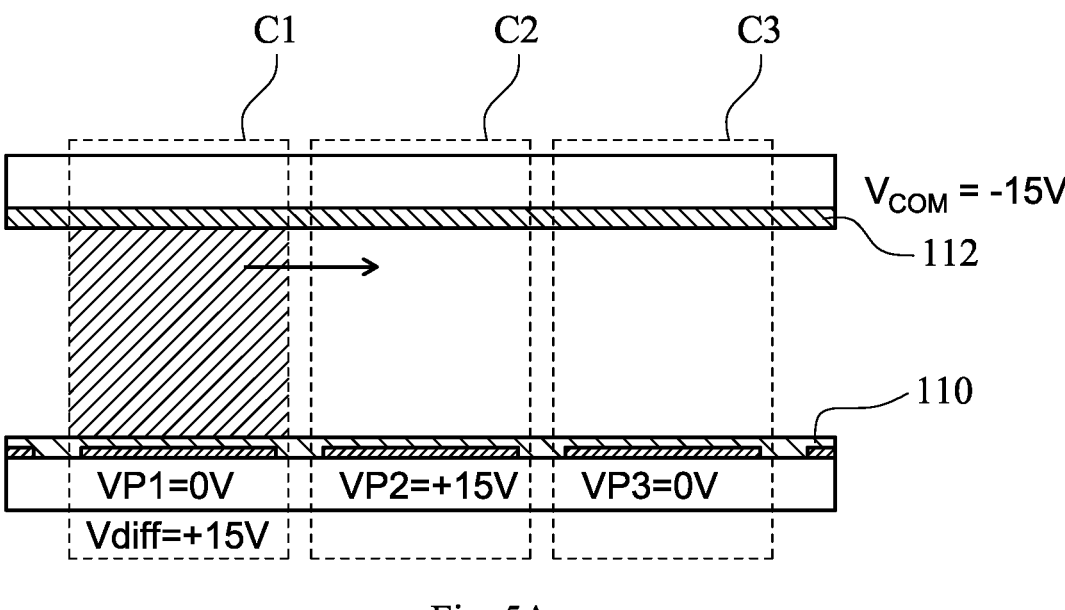
FIGS. 5A-5D are schematic diagrams of EWOD device operations with an AC voltage in accordance with frame time scheme in FIG. 4.

In P frame, Vcom=−15V, drive electrodes VP1, VP3 at 0 volts are inactive, while drive electrode VP2 at +15V are active, accordingly, droplet 10 is moved from unit cell C1 to C2 as shown in FIG. 5A.

In P buffer frame, Vcom=+15V, all of drive electrodes (VP1, VP2, VP3) are at +15V, EWOD device is in a deactivated state as shown in FIG. 5B.

Figure 5C:
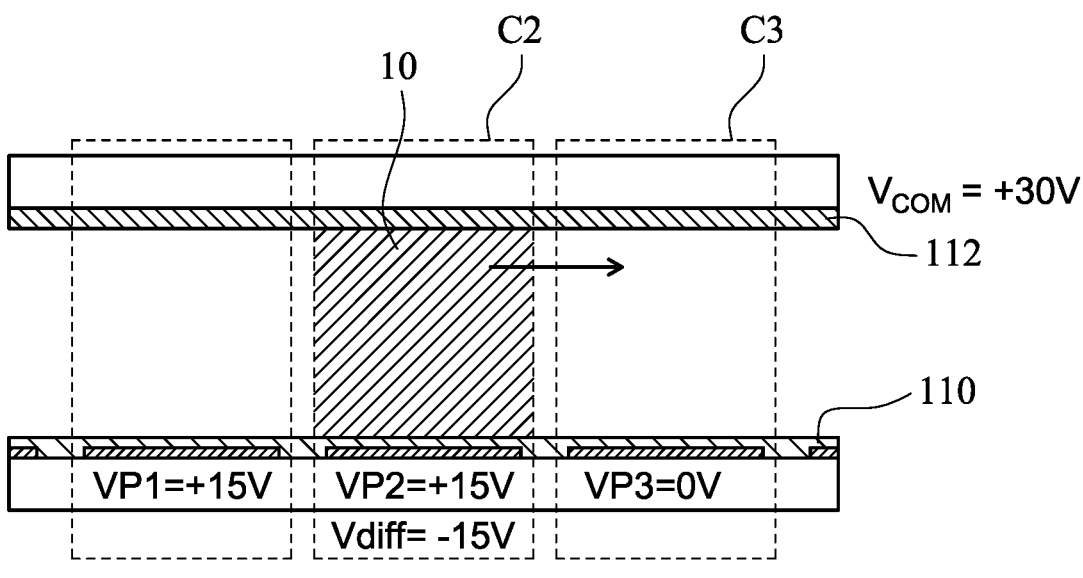

In N frame, Vcom=30V, drive electrodes VP1, VP2 remain at +15V and active drive electrode VP3 set to 0 volts, accordingly, droplet 10 is moved from unit cell C2 to C3 as shown in FIG. 5C.

Figure 5D:
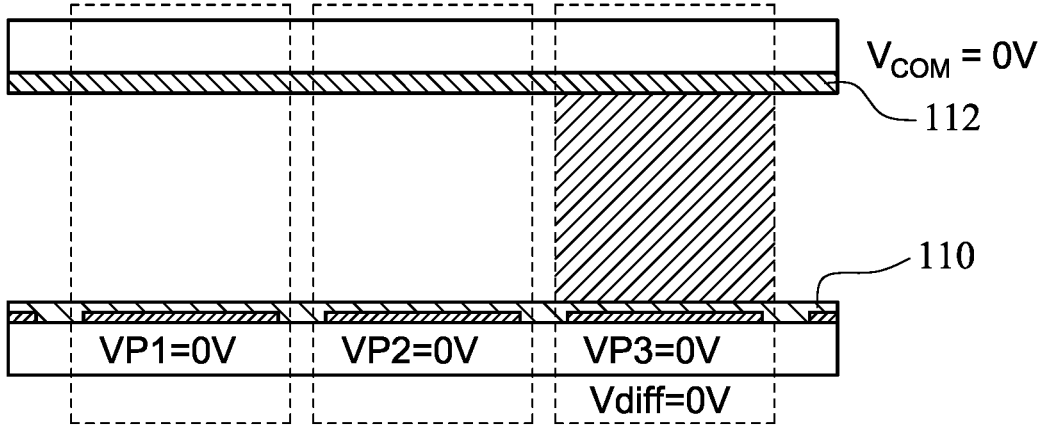

In N buffer frame: all of electrodes, i.e., VP1, VP2, VP3, Vcom, are set to 0 volts, EWOD device is deactivated as shown in FIG. 5D.

In the above AC voltage scheme, one whole period is completed and the potential across dielectric layer 110 is ±30V without polarization. However, in this scheme as shown in FIG. 4, Vcom requires four voltage levels and a voltage variance of 45V. As rating voltage of source of a transistor is 15V, the total voltage variation of this scheme requires 60V as to meet the requirement of ±30V, accordingly, Vcom with voltage variance of 45V under source with 0, 15V variance is reasonable. Buffer frames with +15V and 0V voltage levels are used to keep the charges of the moved droplet.

Through the above schemes, the ground electrode and drive electrodes may be supplied with high frequency signals to hold the status of the cell. However, input signals for drive electrodes have to be AC signal instead of one single DC signal.

Figure 6:
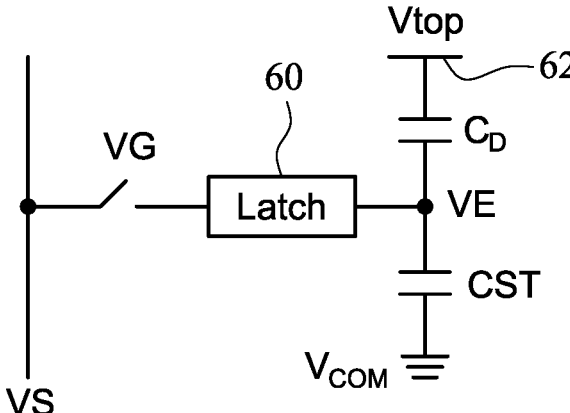
FIG. 6 illustrates a latch circuit for a pixel in accordance with an embodiment.

FIG. 6 is a schematic diagraph of a latch circuit for a pixel of this invention. As shown in FIG. 6, a latch unit 60 is used for storing a write signal of high or low (1,0) and a switch is illustrated to represent switch transistor SW (FIG. 2) controlled by a gate signal VG. When VG=high (or logical "1"), a source data pulse VS from a matrix source line is transferred to input of the latch unit 60. The element of droplet 10 (FIG. 1) is indicated as a capacitor $C_D$ and connected between a latch output node VE and a common top electrode having a common top voltage Vtop. When Vtop varies during VG=low (or logical "0"), the output voltage VE for controlling droplet would also be changed due to charge conservation. By introducing latch unit 60, though there are voltage variance to output voltage VE, however, output voltage VE would go back to its original voltage level by means of positive feedback of the latch unit 60 such that droop of output voltage VE caused by movement of droplet or external voltage variation is minimized. This renders droplet device operated as desired.

Figure 7A:
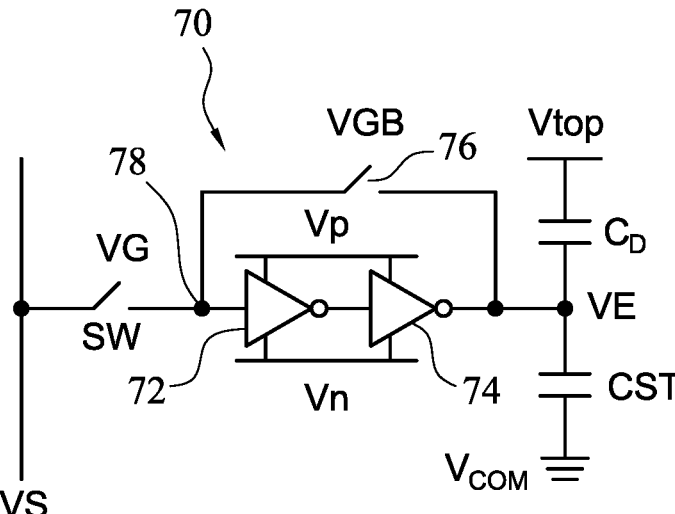
FIG. 7A is a schematic diagram showing a configuration used in the latch circuit in FIG. 6.
Figure 7B:
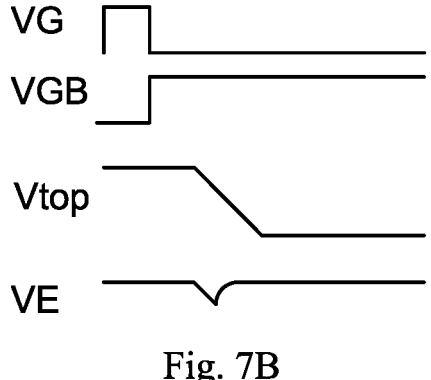
FIG. 7B is a diagram showing waveforms of input/output signals from the latch circuit in FIG. 7A.

FIG. 7A illustrates an embodiment of a latch unit 70 for executing the function of latching the voltage as described with reference to FIG. 6. FIG. 7B is a timing chart of the circuit in FIG. 7A. In FIG. 7A, latch unit 70 is implemented by two serially connected CMOS inverters 72, 74 and a switch 76 connected in parallel with these two inverters 72, 74. Alternatively, the CMOS inverters 72, 74 in FIG. 7A may be fulfilled by an RS flip-flop formed with NAND gates or NOR gates between an input node 78 and an output terminal VE. In FIG. 7A, a switch SW controlled by signal VG is used to represent the switch transistor SW in FIG. 2. If the EWOD system is in CMOS technology, then the inverter or RS flip-flop scheme may suitably applied. However, when the EWOD system is in an amorphous process or IGZO, only NMOS can be applied to latch design, a disadvantage occurs as discussed with reference to FIG. 8.

Figure 8:
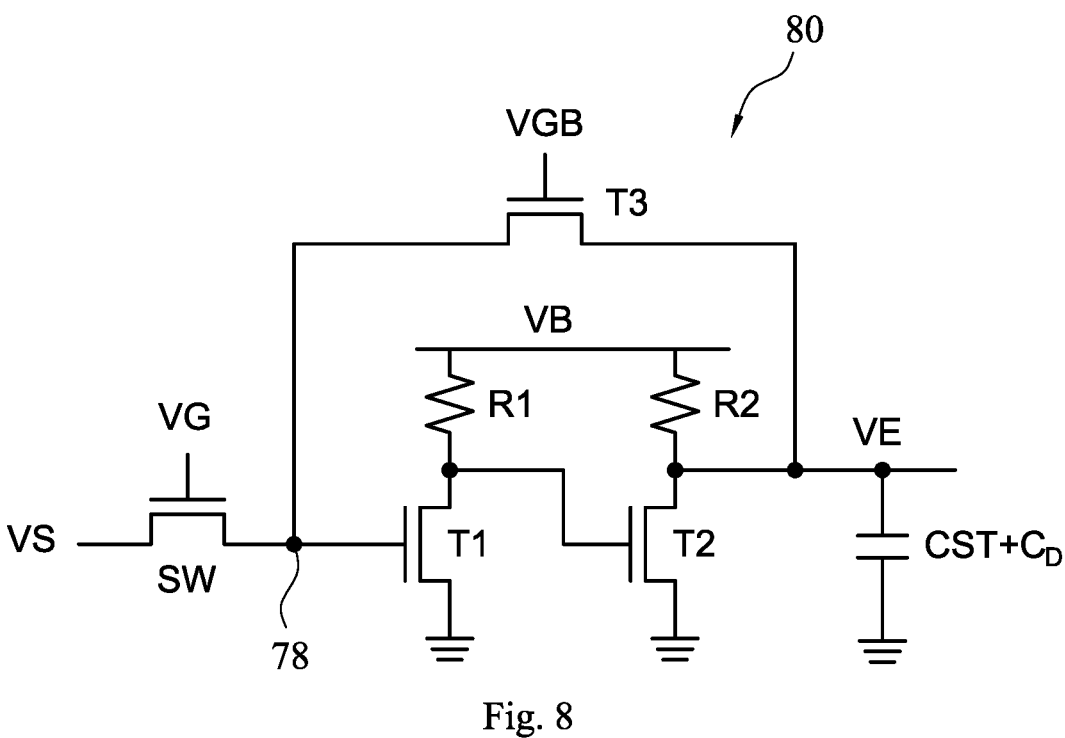
FIG. 8 is a further latch circuit for an EWOD pixel in accordance with an embodiment.

In FIG. 8, a latch circuit 80 for an EWOD pixel in FIG. 3 is shown, a first NMOS transistor T1 and a second NMOS transistor T2 are connected between the input node 78 and the output terminal VE and used to fulfill inverters 72, 74 as shown in FIG. 7A, wherein the first NMOS transistor T1 has a source that is connected by a pull-up resistor R1 to a power supply VB and is also connected to a gate of the second NMOS transistor T2, a gate that is connected to the input node 78 and a drain that is connected to ground. The second NMOS transistor T2 has a source that is connected by a pull-up resistor R2 to the power supply VB and is also connected to the output terminal VE and a drain that is also connected to ground. NMOS transistors SW and T3 are used to fulfill switches SW, 76 in FIG. 7A and controlled by gate voltage signals VG and VGB, respectively. Accordingly, when VG=1 and VGB=0, a source data pulse VS at source of switch transistor SW may be transferred to output of latch circuit 80 as an output latch voltage. When VG=0 and VGB=1, a positive feedback is formed by NMOS transistor T3 such that even the output latch voltage is influenced by re-distribution of charge of droplet, output latch voltage VE of the latch circuit 80 would keep substantially constant as mentioned. However, as pull high elements R1, R2 for transistors T1 and T2 are resistive, they constantly consume power even when potential for VG are low.

Figure 9:
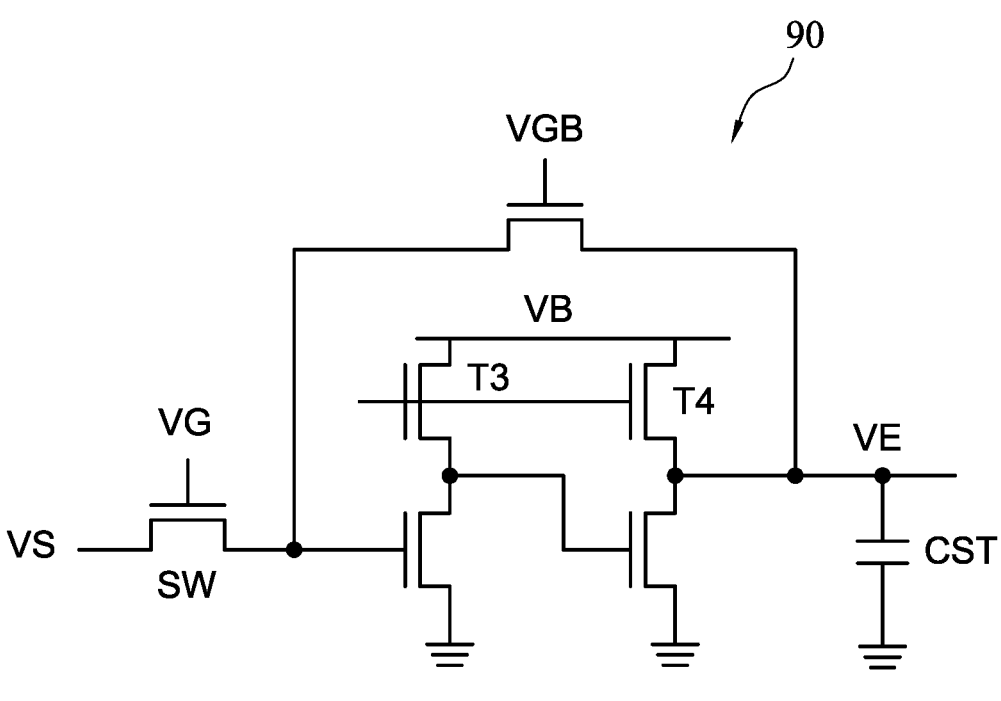
FIG. 9 is another latch circuit for an EWOD pixel in accordance with an embodiment.

Accordingly, a further embodiment of substituting cascaded NMOS transistors T3, T4 for pull high resistors is illustrated in FIG. 9. However, the disadvantages for this latch circuit 90 are: the maximum acceptable operating voltage is limited to threshold voltage of NMOS transistors, i.e., VB–Vth; and there could be mismatch among transistors; and there could be variation to maximum voltage for each individual pixel.

Figure 10:
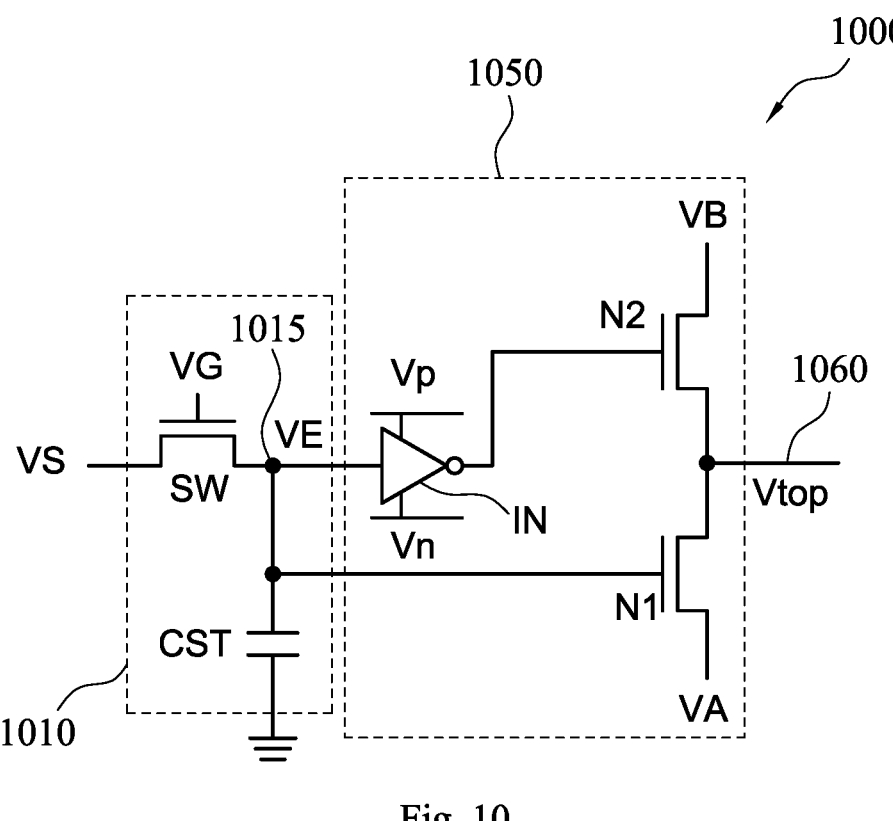
FIG. 10 is a driving circuit for an EWOD pixel in accordance with an embodiment.

A driving circuit 1000 for an EWOD pixel in accordance with an embodiment is shown in FIG. 10. The driving circuit 1000 is arranged so as to supply a driving voltage Vtop to a top electrode 1060 of an EWOD pixel and includes a latch circuit 1010 having a latch output node 1015 and an inversion circuit 1050. In this embodiment, the latch circuit 1010 is the same circuit as the circuit 20 shown in FIG. 2. However, the latch circuit 1010 can be the same circuit as the latch circuits 70, 80, or 90 shown in FIGS. 7, 8 and 9. Similar to circuit 20 in FIG. 2, a digital voltage VE corresponding to either logic "0" or logic "1" state may be written to the latch output node 1015 by applying source data pulse VS to source of switch transistor SW and high level gate signal VG to gate of switch transistor SW. This turns on the switch transistor SW and the source data pulse VS is then written to the latch output node 1015 and stored across the storage capacitor CST.

In FIG. 10, the inversion circuit 1050 includes two NMOS transistors N1 and N2 connected in series between power voltages VA and VB with the driving voltage Vtop between transistors N1 and N2 at the top electrode 1060. A CMOS inverter IN is connected between the latch output node 1015 of the latch circuit 1010 and gate of transistor N2. The latch output node 1015 of the latch circuit 1010 is further connected to gate of transistor N1.

In the case wherein logic "1" state is written to the latch circuit 1010, the inversion circuit 1050 becomes configured such that the transistor N1 is turned on, and the transistor N2 is turned off. As a result, power voltage VA is applied to the top electrode 1060 as Vtop. Alternatively, in the case where logic "0" state is written to the latch circuit 1010, the inversion circuit 1050 becomes configured such that the transistor N1 is turned off and the transistor N2 is turned on. In this case, power voltage VB is applied to the top electrode 1060 as Vtop. Accordingly, transistors N1 and N2 are alternatively activated/deactivated such that driving voltage Vtop is either VA or VB. In this circuit arrangement, as latch signal across capacitor CST is not easily influenced by the top electrode 1060, drive voltage Vtop is constant and not substantially influenced.

Figure 11:
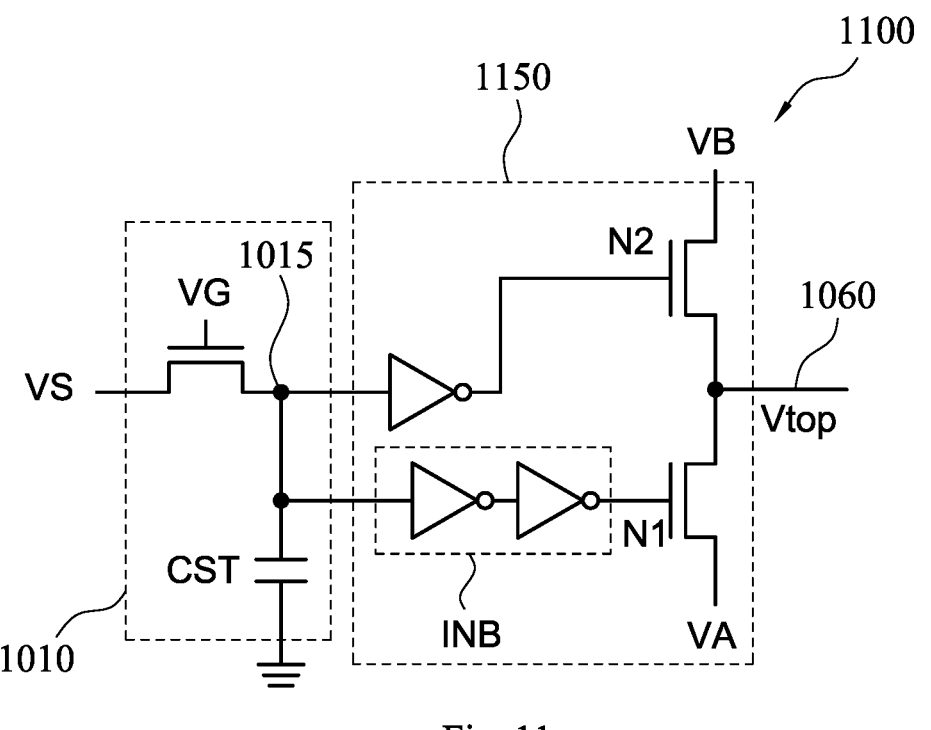
FIG. 11 is another driving circuit for an EWOD pixel in accordance with an embodiment.

FIG. 11 shows another embodiment of driving circuit 1100 for an EWOD pixel. Driving circuit 1100 includes a latch circuit 1010 with a latch output node 1015 and an inversion circuit 1150 with a driving voltage Vtop between transistors N1 and N2 at the top electrode 1060 as in FIG. 10. Compared with FIG. 10, an inverter buffer INB including two inverter coupled in series is arranged between the latch output node 1015 of the latch unit 1010 and gate of transistor N1 as shown in FIG. 11 for further improving the capability of anti-interference.

In FIGS. 10 and 11, the voltage for power voltages VA and VB can be alternatively arranged either in an AC or DC configuration, or a combination thereof. That is, both power voltages VA and VB may be in an AC configuration, or a DC configuration, or either one in AC configuration. In these options, AC configuration is preferred in view of keeping the pixel steady and adaptation for different frequencies for different chemical feature of droplets.

Figure 12:
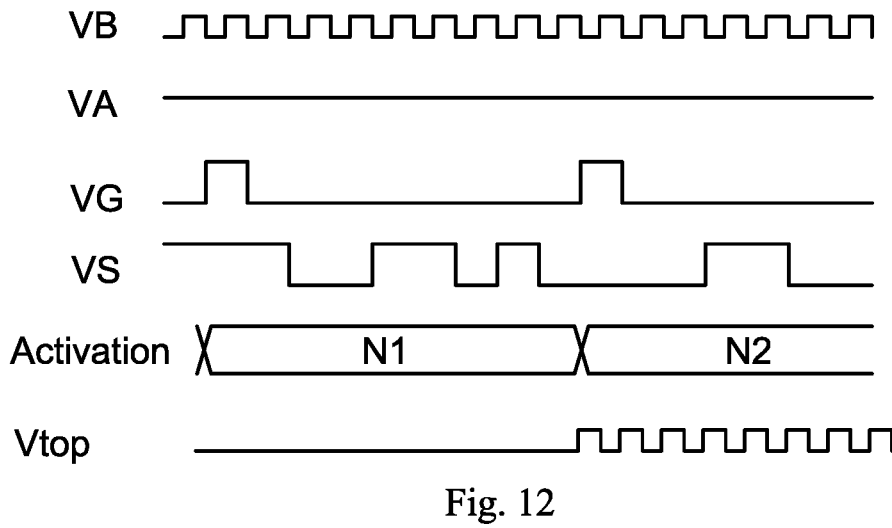
FIG. 12 is a diagram showing waveforms of input/output signals from the driving circuit in FIG. 11.

FIG. 12 is an illustrative timing chart of various input/output signals of the driving circuits in FIGS. 10 and 11, when gate signal VG is on, transistors N1 and N2 will record the source data pulse VS and decide which of the NMOS transistors is activated such that either power voltage VA or power voltage VB is selected on the top electrode 1060 according to system's request.

Figure 13:
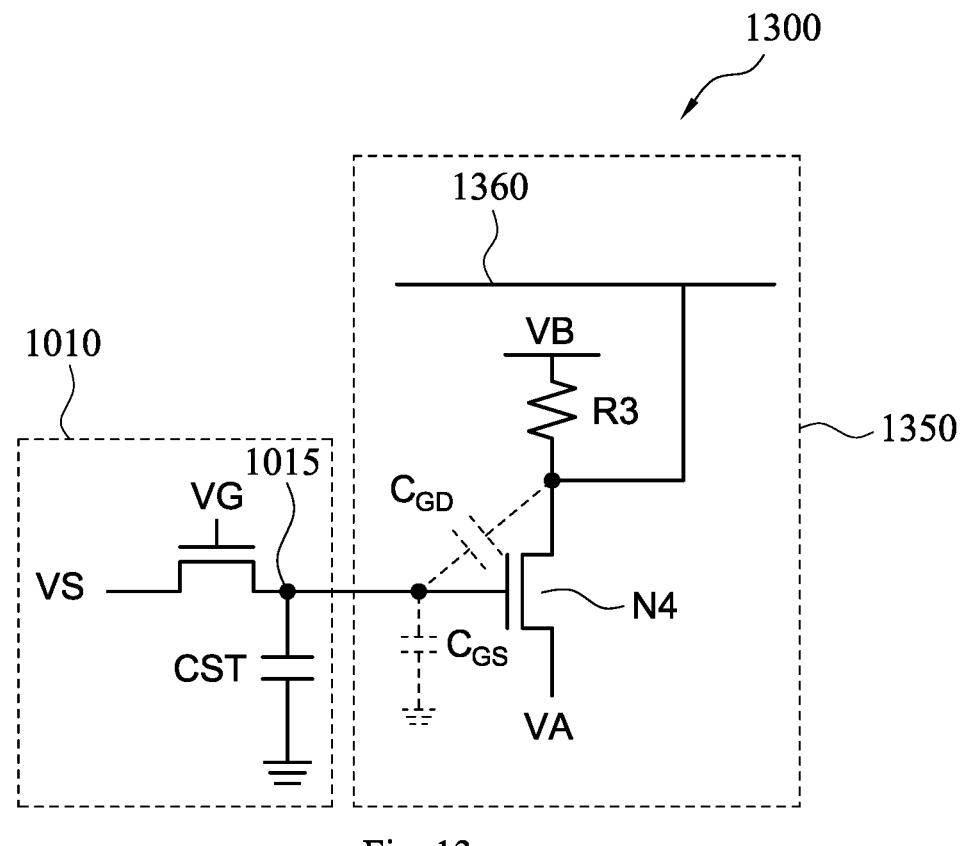
FIG. 13 is a schematic diagram showing a driving circuit in accordance with an embodiment.

In case, only NMOS is available to the system, then, FIG. 10 can be reduced as shown in FIG. 13. Driving circuit 1300 includes a latch circuit 1010 with a latch output node 1015 as in FIG. 10 and an inversion circuit 1350. When source data pulse VS is inputted, the required information is stored at a capacitor $C_{GS}$ (as shown in phantom lines), i.e., natural capacitance of MOS transistor N4, accordingly, voltage signal across the capacitor $C_{GS}$ can be used to whether pull down or pull up the potential of upper metal electrode 1360. During operation, the potential of the upper metal electrode 1360 may be varied due to charge transfer. This potential variation could be transferred back through a capacitor $C_{GD}$ (as shown in phantom lines), i.e., natural capacitor of NMOS transistor N4 in a negative feedback path. When there is an abrupt surge in the voltage level of upper metal electrode 1360, the unexpected signal will be transferred back to gate of NMOS transistor N4 via the capacitor $C_{GD}$ and renders a higher gate voltage. Then the output voltage of the upper metal electrode 1360 will be pulled low and the output voltage is regulated. As capacitance of capacitor $C_{GD}$ is minor, influence caused by capacitor $C_{GD}$ is small such that the EWOD pixel is stabilized. Certainly, additional storage capacitor can be added in parallel with $C_{GS}$ as to further stabilize the EWOD pixel. Certainly, the pull up resistor R3 in FIG. 13 may be replaced by an NMOS transistor with bias voltage in gate electrode thereof.

Figure 14:
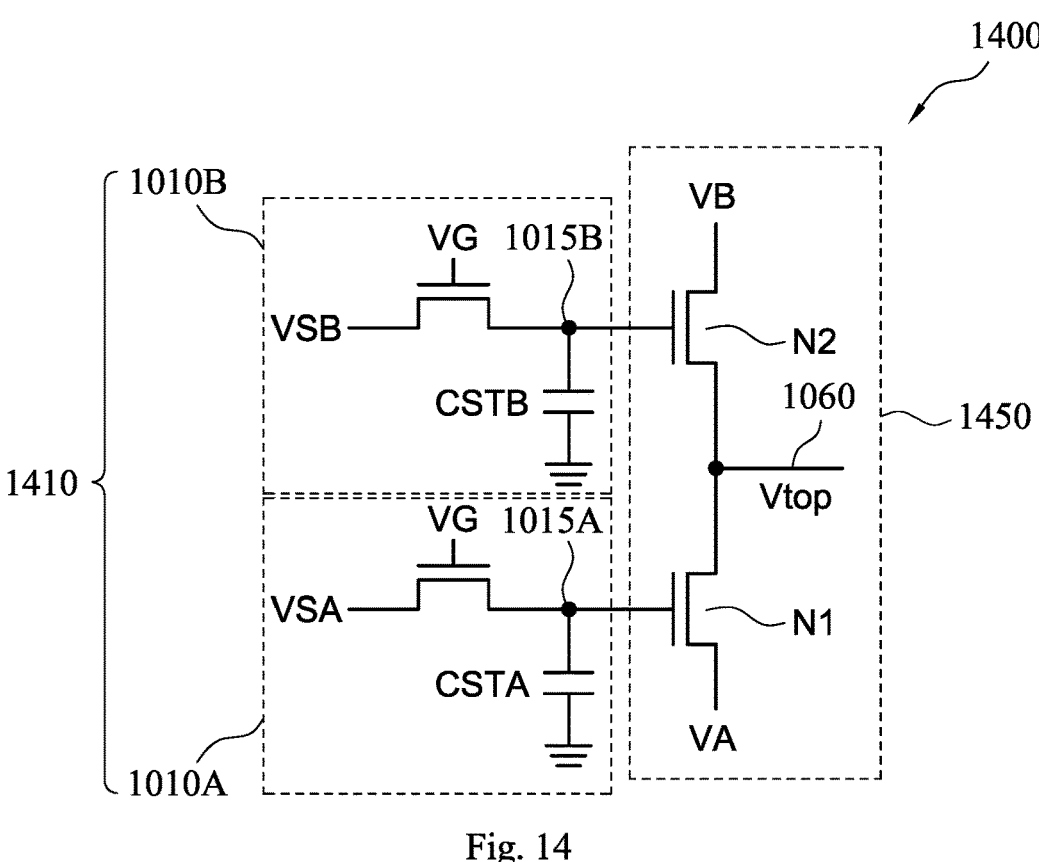
FIG. 14 is another driving circuit for an EWOD pixel with two source driving signals in accordance with an embodiment.

A further embodiment of a driving circuit 1400 for an EWOD pixel is shown in FIG. 14. Driving circuit 1400 includes an inversion circuit 1450 with two NMOS transistors N1 and N2 connected in series between power voltages VA and VB with a driving voltage Vtop between transistors N1 and N2 at the top electrode 1060 as in FIG. 10 and a latch portion 1410 formed by two latch circuits 1010A, 1010B in parallel with output nodes 1015A, 1015B connected to gates of transistors N1 and N2, respectively. Compared with the circuit in FIG. 13, there is no pull up resistor that causes constant power consumption. However, two source data pulses VSA, VSB and two storage capacitors CSTA, CSTB are required as a tradeoff.

Figure 15:
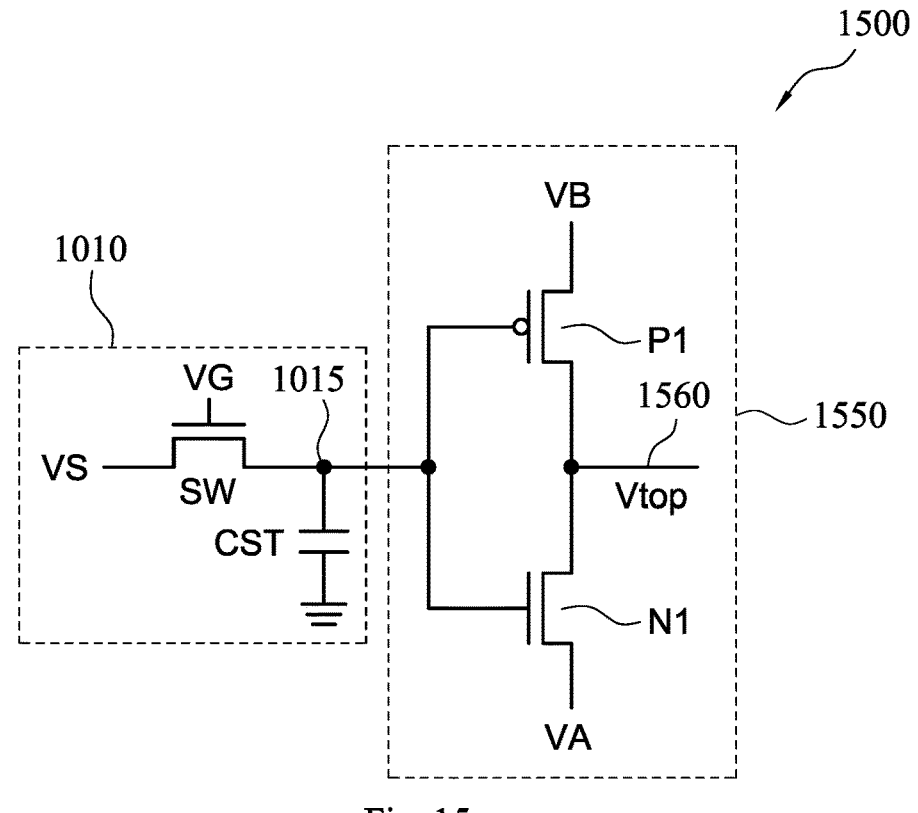
FIG. 15 is another driving circuit for an EWOD pixel with CMOS configuration in accordance with an embodiment.

FIG. 15 shows an illustrative circuit diagram of driving circuit 1500 for an EWOD pixel. Driving circuit 1500 includes a latch circuit 1010 with a latch output node 1015 and an inversion circuit 1550 formed by an NMOS transistor N1 and a PMOS transistor P1 connected in series between power voltages VA and VB with a driving voltage Vtop between transistors N1 and P1 at a top electrode 1560 and gates of transistors N1 and P1 connected with the latch output node 1015 of the latch circuit 1010, i.e., the inversion circuit 1550 is implemented by CMOS technology. As shown in FIG. 15, only one capacitor CST is required to hold source information of source data pulse VS of switch transistor SW. When source data pulse VS and gate signal VG are high, driving voltage Vtop at the top electrode 1560 is VA, otherwise, driving voltage Vtop is VB. In FIG. 15, only one source data pulse is required, the operation of this circuit arrangement is the same as that of FIG. 10 and the information stored at capacitor CST is kept steady due to negative feedback such that the driving voltage Vtop at top electrode 1560 will not be varied by charge variation.

Figure 16:
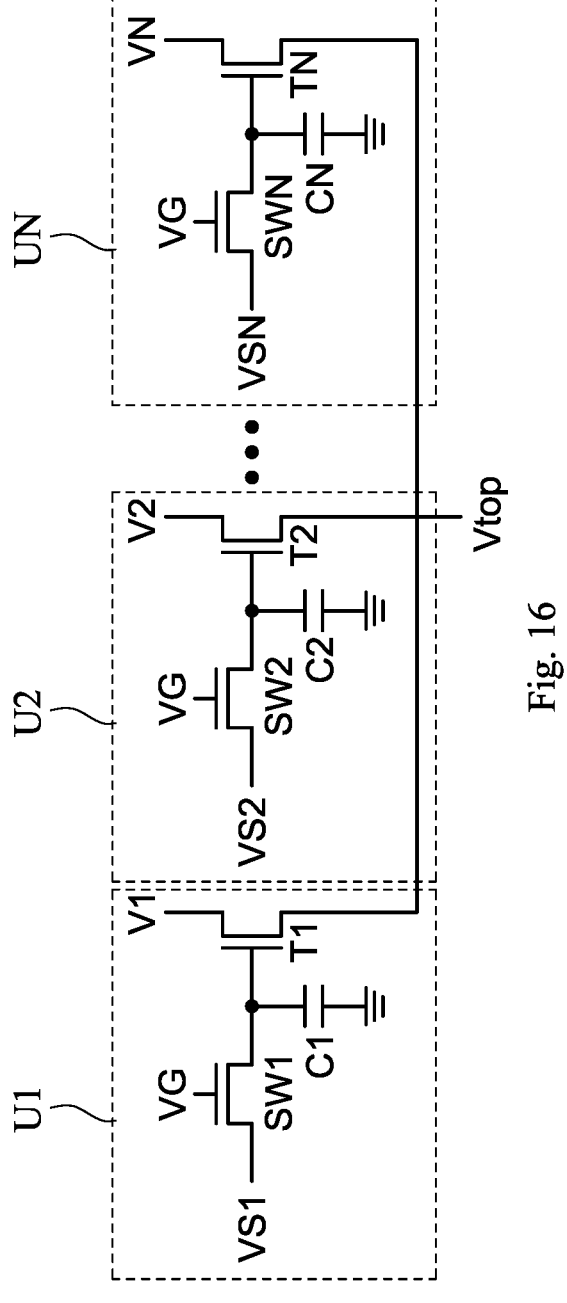
FIG. 16 illustrates a driving circuit with N-source driving signals in accordance with an embodiment.

In addition to two power voltages VA and VB, further power voltage(s) may be needed in accordance with system's requirement. And, the signals of these power voltages may be of sine wave, square wave, etc. Accordingly, an N-source driving circuit is shown in FIG. 16. There are N circuit units U1 . . . UN connected in parallel. Each of circuit unit U1 . . . UN consists of a switch transistor (SW1, . . . SWN), a storage capacitor (C1, . . . CN) and a drive transistor (T1, . . . TN) with drain of the switch transistor (SW1, . . . SWN) connected to gate of drive transistor (T1, . . . TN) and the storage capacitor (C1, . . . CN) connected between gate of drive transistor (T1, . . . TN) and ground, and source of the drive transistor (T1, . . . TN) connected to a respective power voltage (V1, . . . VN) and drain of the drive transistor (T1, . . . TN) connected to a common node with a driving voltage Vtop. When any gate signal VG of the respective switch transistor (SW1, . . . SWN) is high, output drive voltage Vtop can be selected as a corresponding power voltage V1, V2, . . . VN based on state of source data pulse (VS1, . . . VSN). As this circuit arrangement is merely for one pixel with N source signal lines (VS1, VS2, . . . VSN), a decoder may be applied for reducing the complexity of wiring.

Figure 17:
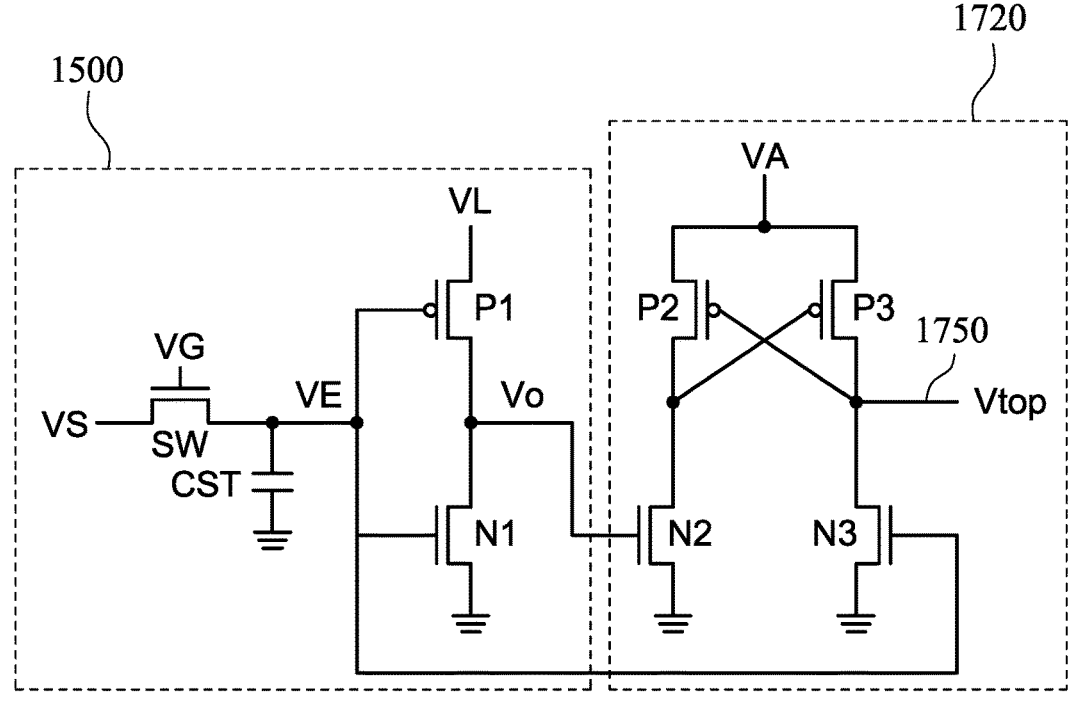
FIG. 17 illustrates a further driving circuit for an EWOD pixel in accordance with an embodiment.

As mentioned, each driving circuit must be able to apply high operative voltages to the selected EWOD pixel for moving droplet. These voltages are higher than the supply voltage of a driving circuit 1500 of CMOS type as shown in FIG. 15. Accordingly, in FIG. 17, a shifter circuit 1720 after the driving circuit 1500 is provided for converting the logical signals from a lower source data pulse VS of the driving circuit 1500 into a high voltage necessary during electrowetting operation. As shown, the driving circuit 1500 of CMOS type is supplied between the low voltage VL (such as 3V) and ground and receives the source data pulse VS and provides a corresponding complemented output signal Vo to the shifter circuit 1720. The shifter circuit 1720 includes two PMOS transistors P2 and P3 and two NMOS transistors N2 and N3. Transistors P2 and P3 have source terminals that receive an operative voltage VA (for example, VA=15V). Transistor N2 and N3 have the corresponding source terminals connected to drain terminals of transistors P2 and P3, respectively. Gate terminal of transistor P2 is connected to the drain of transistor P3 and gate terminal of transistor P3 is connected to drain terminal of transistor P2 as to form a cross-coupled pull-up, which provides a level-shifted output voltage Vtop to a top metal electrode 1750.

Transistors N2 and N3 have source terminals grounded. Gate terminal of transistor N3 receives a digital voltage VE of latch circuit in the driving circuit 1500. Transistor N2 has gate terminal that receives the complemented output signal Vo from driving circuit 1500.

When source data pulse VG is asserted (at supply voltage VL, e.g., 3V), the complemented output voltage Vo is deasserted (at ground). In this biasing condition, transistor N3 is on. Therefore, level-shifted output voltage Vtop is brought to ground.

At the same time, transistor N2 is off. As a result, transistor P2 is on (because its gate terminal receives ground voltage by means of transistor N3). However, transistor P2 is connected in series to transistor N2, thus both transistor N2 and P2 cannot conduct any current because transistor N2 is off. Transistor P2 has drain terminal that is brought to operative voltage VA. In this biasing condition, transistor P3 is also off, so as not to interfere with the level-shifted output voltage Vtop.

On the contrary, when the source data pulse VS is deasserted and the complemented output voltage Vo is asserted, transistor N2 is on and transistor N3 is off. In this way, transistor P3 is turned on and transistor P2 is turned off, so as to bring the level-shifted output voltage Vtop to operative voltage VA. The driving circuit 1500 has a lower power voltage VL (e.g., 3V) such that switch transistor SW may be operated with a lower source signal VS and a lower gate signal VG. The shifter circuit 1720 has a higher operative voltage VA (e.g., 15V) for providing the driving voltage Vtop on top electrode 1750.

As EWOD device needs a high voltage to drive droplet and voltage endurance for TFTs and other types of transistors is generally poor, droplet moves relatively slow or hardly move in a low voltage drive system. However, when a high voltage circuit system is applied, the complexity of the circuit system become unwieldy and cost of modularization become prohibitive.

Figure 18:
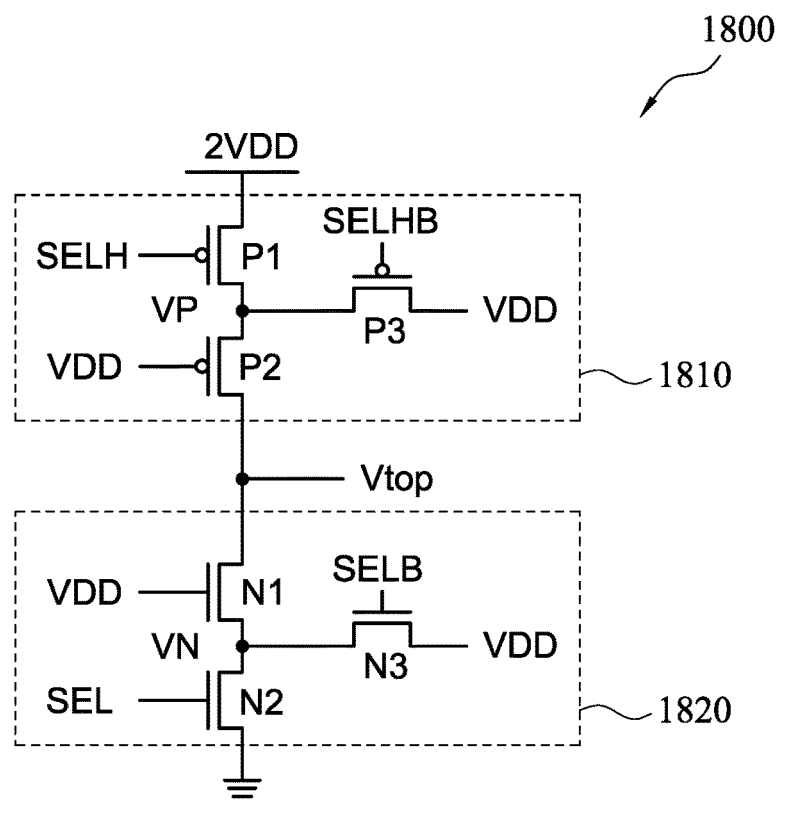
FIG. 18 illustrates a schematic diagram of a further driving circuit in accordance with an embodiment.

FIG. 18 illustrates an example driving portion of the driving circuit 1800 with raised output voltage under low voltage endurance requirement, in accordance with at least one aspect described in the present disclosure. The driving portion 1800 may correspond to at least a portion of the shifter circuit 1720 described above in relation to FIG. 17.

Figure 19A:
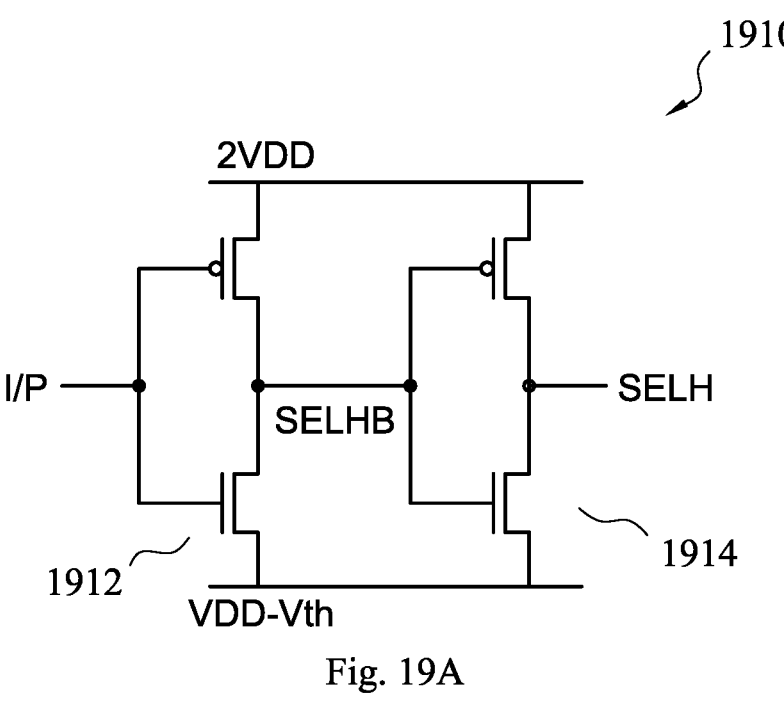
FIGS. 19A and 19B are schematic diagrams of buffer circuits for high voltage region and low voltage region of driving circuit in FIG. 18.
Figure 19B:
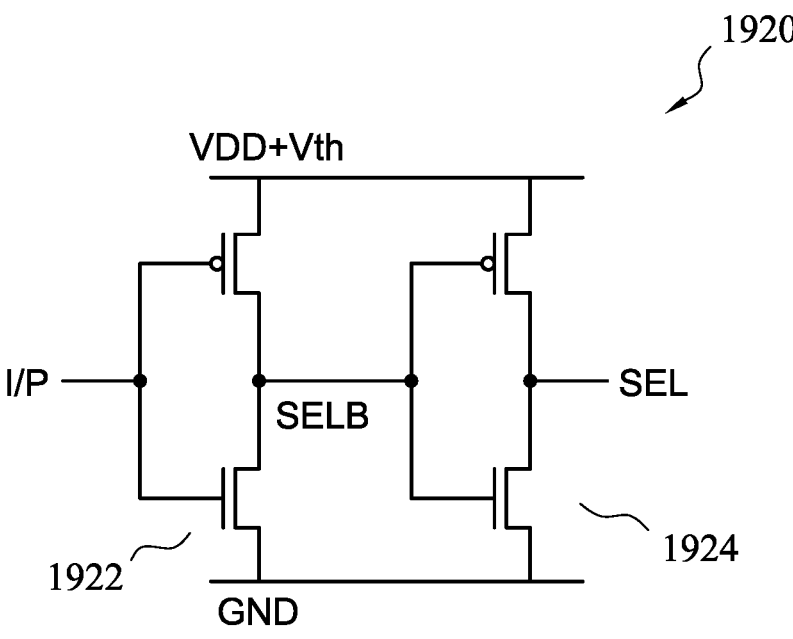

In FIG. 18, the driving portion 1800 may comprise a high voltage region 1810 and a low voltage region 1820 between a power voltage 2VDD and a ground terminal. The high voltage region 1810 includes serially-connected PMOS transistors P1 and P2 and a selection PMOS transistor P3 connected between a connection node VP of PMOS transistors P1 and P2 and a power voltage VDD. The low voltage region 1820 includes serially-connected NMOS transistors N1 and N2 and a selection NMOS transistor N3 connected between a connection node VN of NMOS transistor N1 and N2 and the power voltage VDD. Each of PMOS transistors P1-P3 and NMOS transistor N1-N3 have a voltage endurance of VDD+Vth, wherein Vth is a threshold voltage of each transistors. Gates of PMOS transistor P2 and NMOS transistor N1 are coupled to a power voltage VDD. Disable inputs SELH, SELHB are coupled to gates of PMOS transistors P1 and P3, respectively. Enable inputs SEL and SELB are coupled to gates of NMOS transistor N2 and N3, respectively. An output terminal with a driving voltage Vtop is coupled to a connection node between PMOS transistor P2 and NMOS transistor N1. FIGS. 19A and 19B illustrate buffer circuits 1910, 1920 for high voltage region 1810 and low voltage region 1820 in FIG. 18, respectively. Buffer circuit 1910 includes two serially-connected inverters 1912 and 1914 between power voltages 2VDD and VDD−Vth. Inverter 1912 includes an output node for the disable input SELHB in FIG. 18. Inverter 1914 includes an output end for the disable input SELH in FIG. 18. Buffer circuit 1920 includes two serially-connected inverters 1922 and 1924 between power voltage VDD+Vth and ground terminal GND. Inverter 1922 includes an output node for the enable input SELB in FIG. 18. Inverter 1924 includes an output end for the enable input SEL in FIG. 18. External level shifters (not shown) may be used to provide the buffer circuits 1910 and 1920 with the required voltages 2VDD, VDD−Vth, VDD+Vth for driving portion 1800 in FIG. 18, and, ultimately, an EWOD pixel.

Referring to FIG. 18, when input signals I/P for buffer circuits 1910 and 1920 (in FIGS. 19A and 19B) change to high, enable input SEL changes to VDD+Vth and enable input SELB remains at GND, potential for connection node VN is pulled-down to GND, accordingly, NMOS transistor N3 is turned off with its gate grounded and NMOS transistors N1 and N2 are turned on with their gates connected to power voltages VDD and VDD+Vth such that voltage Vtop of output terminal is pulled low to ground. At the same time, disable input SELH changes to 2VDD, disable input SELHB to VDD−Vth, PMOS transistor P3 is turned on such that potential for connection node VP is pulled to VDD and PMOS transistor P2 is turned off. Accordingly, the voltage Vtop at output terminal is maintained at GND.

Still referring to FIG. 18, when Input signals I/P for buffers circuits 1910 and 1920 (in FIGS. 19A and 19B) change to low, enable input SEL discharges to GND, enable input SELB is provided with VDD+Vth, NMOS transistor N2 is turned off and NMOS transistor N3 is turned on such that potential for connection node VN is pulled-up to VDD and NMOS transistor N1 is turned off. At the same time, disable input SELH=VDD−Vth, PMOS transistor P1 is turned on and potential for connection node VP is pulled to 2VDD, disable input SELHB is provided with 2VDD such that PMOS transistors P1 and P2 are turned on and PMOS transistor P3 is turned off, accordingly, the voltage Vtop at output terminal is pulled up to slightly lower than 2VDD.

During the operation of driving portion 1800, voltage drop across each of transistors P1-P3 and N1-N3 is less than VDD+Vth and the voltage Vtop at output terminal is slightly lower than 2VDD.

Figure 20:
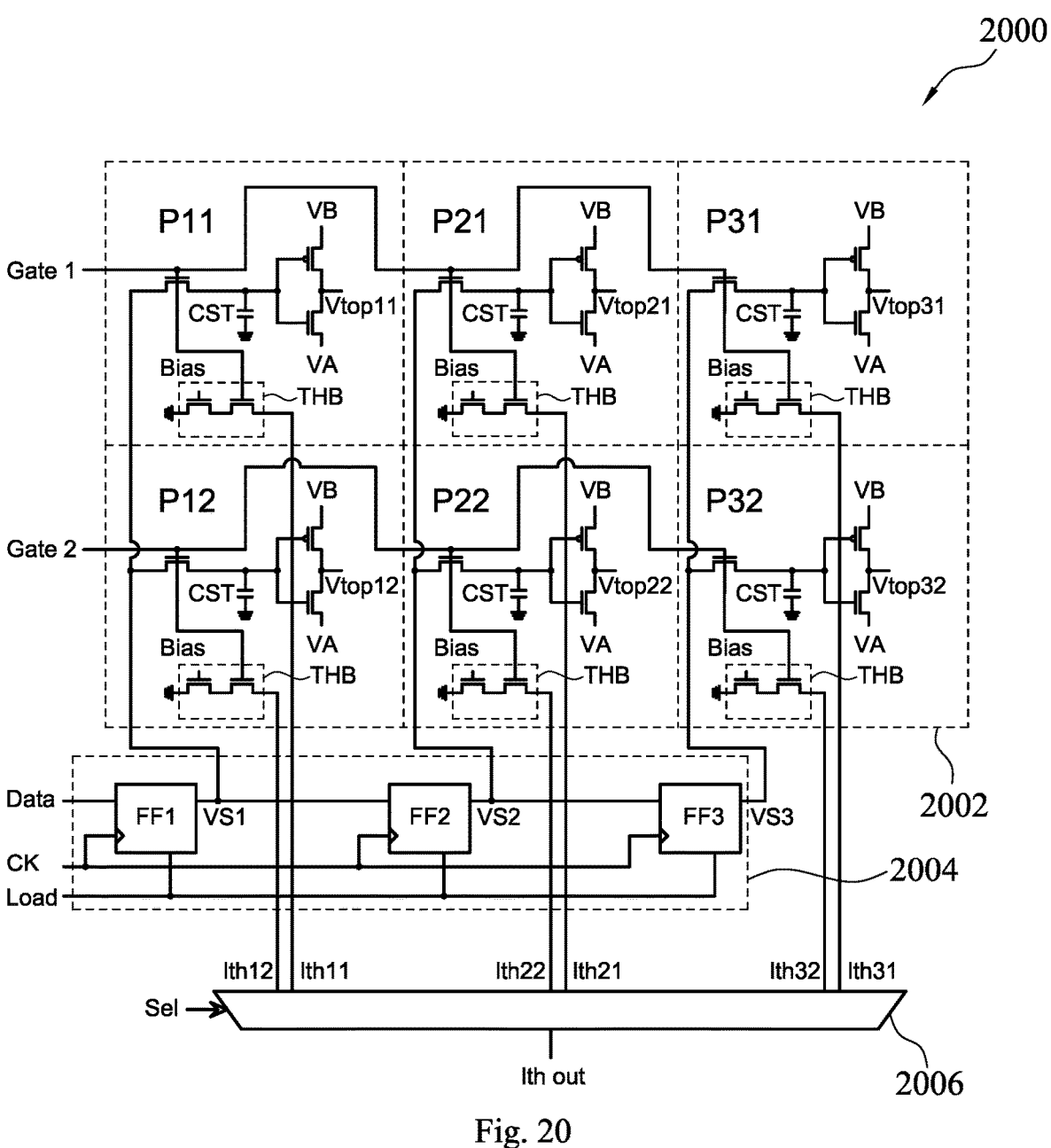
FIG. 20 is a schematic diagram of an EWOD driving system in accordance with an embodiment.

FIG. 20 is a diagrammatic view of a circuit arrangement for an exemplary AM-EWOD system 2000 for controlling droplet operation by an AM-EWOD drive electrode array 2002. For descriptive convenience, the AM-EWOD drive electrode array 2002 is simplified with 2 rows by 3 columns of pixels P11, P12, P21, P22, P31, P32, but those having ordinary skill in the art will appreciate that the array could be virtually any size array. For descriptive convenience, each of pixels P11, P12, P21, P22, P31, P32 contains a driving circuit for EWOD pixel as illustrated in FIG. 15 and a thermal biasing portion THB for sensing temperature of a corresponding EWOD pixel, but those having ordinary skill in the art will appreciate that the driving circuit could be any of the driving circuits as shown in FIGS. 10, 11, 13 and 17. Each of thermal bias portion THB is formed of two serially connected NMOS transistors including a sensor transistor with a gate terminal connected to a bias signal and a selection transistor with a gate connected to a gate of switch transistor SW of latch circuit 1010 (in FIG. 10) and connected to a matrix gate line (e.g., Gate 1, Gate 2) common to each array pixel element within the same row.

Driving system 2000 further includes a shift register 2004 comprising a cascade of flip-flops FF1, FF2 and FF3 for reducing the number of data line drivers (not shown) required by conventional LCD driver. As the shifter register is used for reducing the number of data line drivers, a manufacturing process can be simplified, so that a manufacturing cost can be reduced and yield can be improved. Although flip-flops FF1 to FF3 are provided in the form of D flip-flops for an illustrative purpose, the embodiment is not limited thereto. Each of flip-flops FF1 to FF3 may include, for example, a clock input terminal CK for receiving clock signal from external device, a data input terminal Data, a load input terminal Load for receiving load signal from the outside, and an output terminal. Flip-Flop FF1 outputs a source data signal VS1 to a source of switch transistors of pixels P11 and P12 at the rising edge of a first clock pulse. Flip-flop FF2 outputs a source data signal VS2 to a source of switch transistors of pixels P21 and P22 at the rising edge of a second clock pulse. Flip-flop FF3 outputs a source data signal VS3 to a source of switch transistors of pixels P31 and P32 at a rising edge of a third clock pulse. In other words, flip-flops FF1 to FF3 may sequentially output the source data signals VS1, VS2, VS3 to the sources of the switch transistors in the same column.

Driving system 2000 further includes a selection unit 2006 for receiving a sensing current from a corresponding thermal bias portion THB at a respective input terminals Ith11, Ith12, Ith21, Ith22, Ith31, Ith32. Each of the thermal bias portions THBs is connected between ground and a respective input terminal of the selection unit 2006. Gate signal Gate1 is connected to gates of switch transistors of pixel P11, P21 and P31 of same row. Gate signal Gate 2 is connected to gates of switch transistors of pixels P12, P22 and P32 of same row.

When any one of gate signals Gate1, Gate2 is high, a source data signal of the shift register can be sequentially written to a corresponding output as VS1, VS2 or VS3 by applying clock pulses. A load input is provided for refreshing the output signals VS1, VS2, VS3 when a load signal is high.

Figure 21:
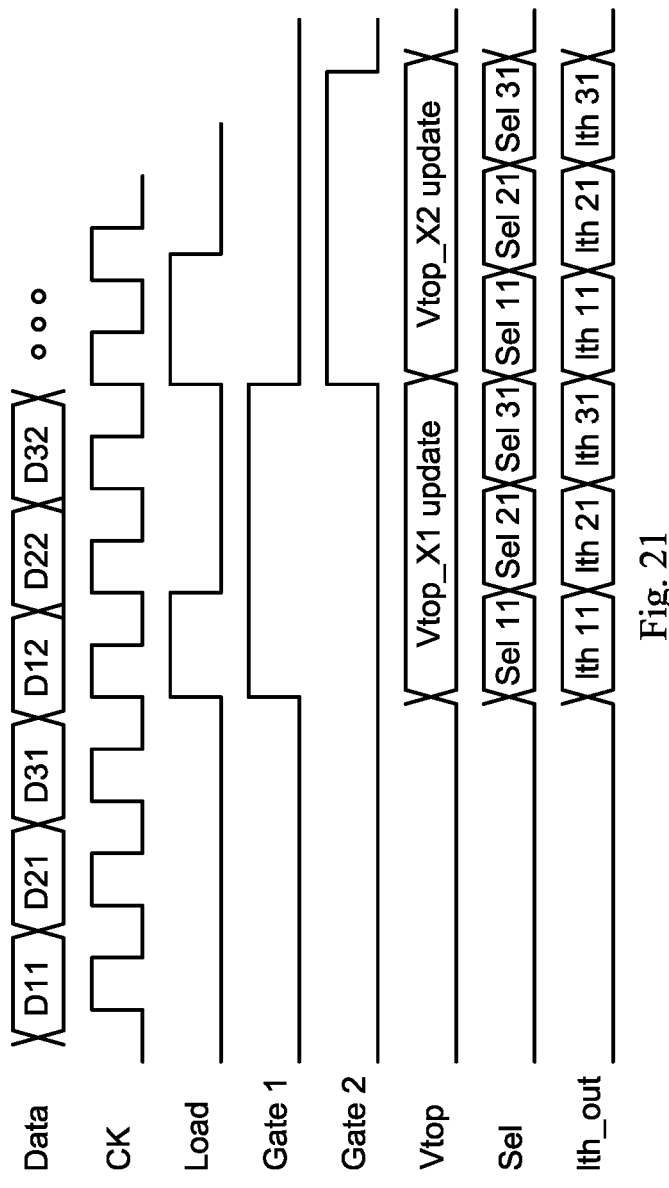
FIG. 21 is a diagram showing waveforms of input/output signals from EWOD driving system in FIG. 20.

FIG. 21 is a timing chart which shows an operation timing of the AM-EWOD system 2000. The logic level of data pulse Data of the shift register is sequentially output as source data signals VS1, VS2, VS3 at each of the individual flip-flops FF1, FF2, FF3 on the rising edge of clock input CK. When both of load signal and matrix gate signal are high, a corresponding pixel would be refreshed. A similar situation is applied to thermal bias portions. When matrix gate signal is high and sequentially selected by Sel signal, an lth_out is read. The speeds for reading thermal sensor and writing EWOD are not necessarily the same as long as EWOD is written to register prior to reading of thermal sensor.

Figure 22:
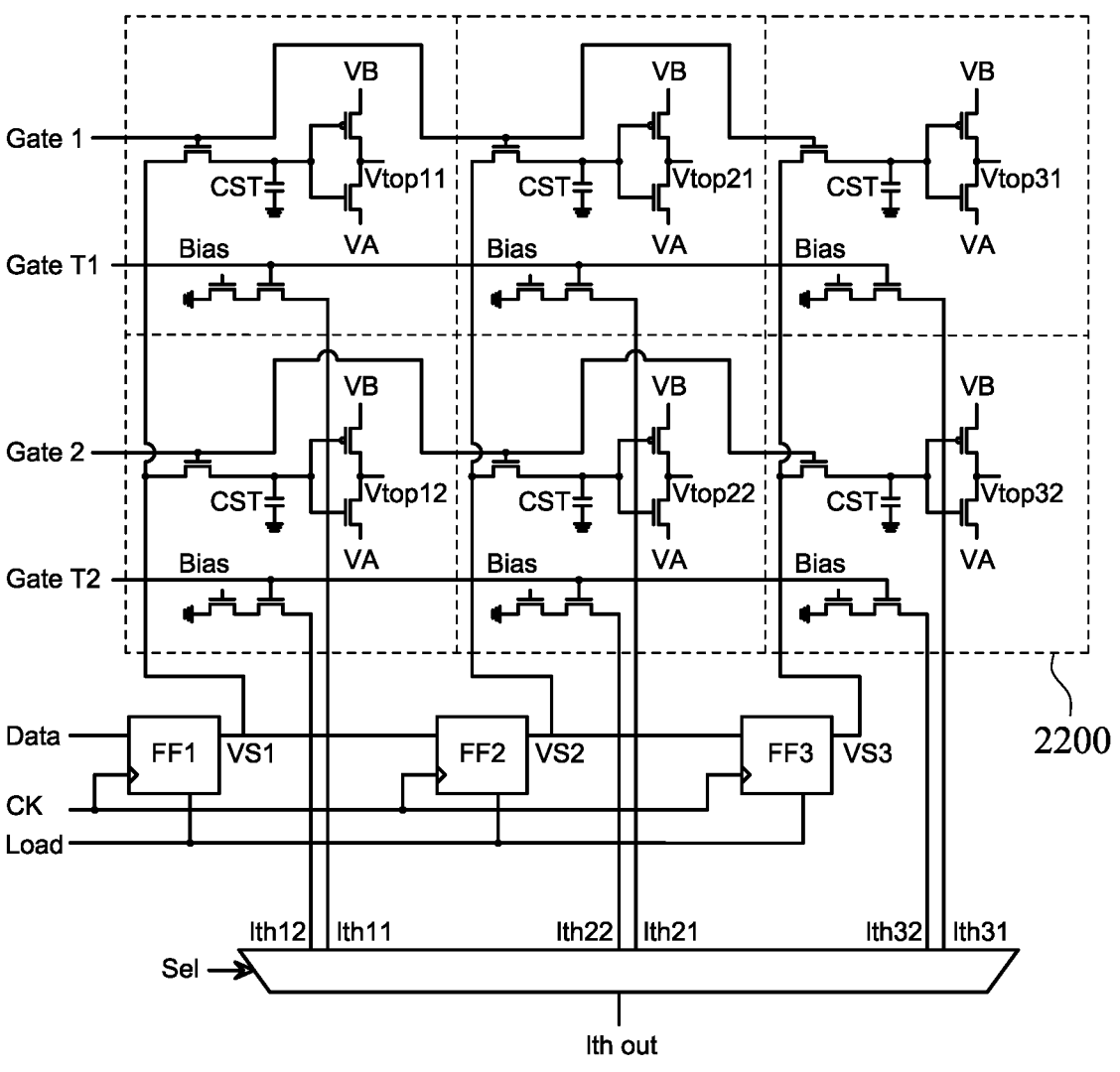
FIG. 22 is another schematic diagram of an EWOD driving system in accordance with an embodiment.

A further embodiment of driving system 2200 is shown in FIG. 22. AM-EWOD system 2200 is the same as that in FIG. 20 except two additional gate signals GateT1 and GateT2 are used in the rows to specifically control the gates of NMOS transistors in the thermal bias portions.

Figure 23:
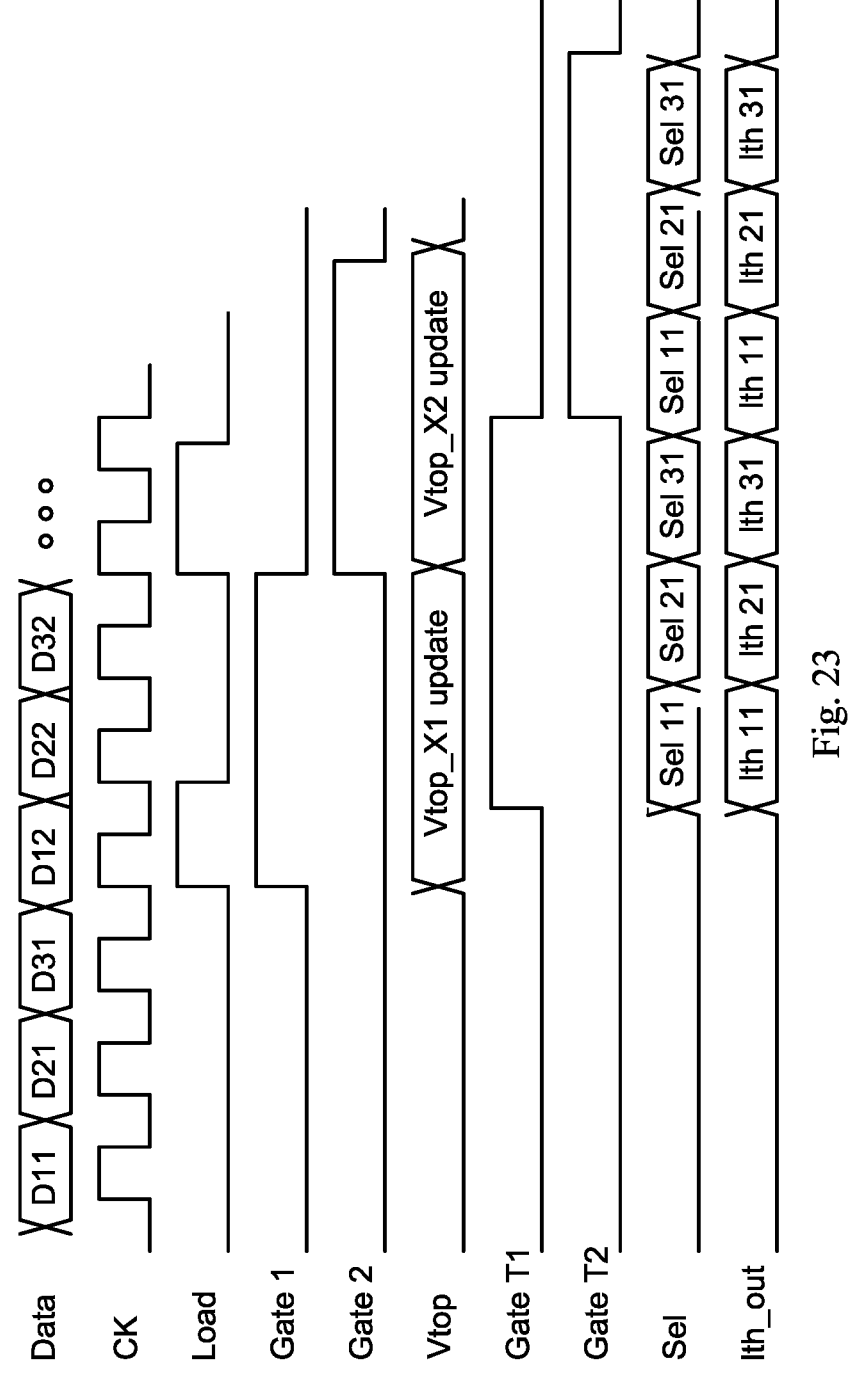
FIG. 23 is a diagram showing waveforms of input/output signals from the EWOD driving system in FIG. 22.

FIG. 23 illustrates a timing chart of operation timing of driving system 2200 in FIG. 22. In FIG. 23, the time duration for gate signal GateT1, GateT2, Gate 1 and Gate 2 are different as well as the output control to thermal sensor. When control speeds of signals for thermal sensor and EWOD pixel are different, it can be solved by applying driving system 2200.

The invention claimed is:

1. A driving circuit for an electrowetting on dielectric (EWOD) pixel, comprising:
   a latch circuit comprising a switch transistor that has a source connected to a matrix source line and a gate connected to a matrix gate line and a storage capacitor connected between a drain of the switch transistor and ground and configured to transmit a source data pulse from the matrix source line to the storage capacitor in response to an activation gate signal that is applied to the gate of the switch transistor and write a latch voltage at a latch output node; and
   an inversion circuit supplied with a first power voltage and a second power voltage and connected to the latch output node for outputting a driving voltage at either the first power voltage or the second power voltage based on the latch voltage at the latch output node;
   wherein the inversion circuit includes a CMOS inverter formed of a first NMOS transistor and a first PMOS transistor connected in series between the first power voltage and the second power voltage for outputting the driving voltage between the first NMOS transistor and the first PMOS transistor with the gates of the first NMOS transistor and the first PMOS transistor connected to the latch output node of the latch circuit.

2. A circuit arrangement for an active matrix electrowetting on dielectric system, comprising:
   an M×N array of pixels arranged in M rows and N columns, each of the pixels including a driving circuit as recited in any of claim 1;
   a shift register circuit including serially connected N flip-flops, each of the N flip-flops connected for sequentially outputting the source data pulses to the sources of the M switch transistors in the same column; and
   M matrix gate lines connected to the gates of the N switch transistors in the same rows;
   wherein each of the pixels further comprises: a thermal bias portion formed of two serially connected NMOS transistors, one of the two serially connected NMOS transistors being a sensor transistor with a gate connected to a bias signal and a drain connected to ground and the other of the two serially connected NMOS transistors being a selection transistor with a gate connected to the gate of the switch transistor and a drain connected to the source of the sensor transistor, and
   the circuit arrangement further comprising a selection unit having (M×N) input terminals connected to source of each selection transistor of the thermal bias portions in the pixels and a column selection terminal.

3. A driving circuit for an electrowetting on dielectric (EWOD) pixel, comprising:
   a latch circuit comprising a switch transistor that has a source connected to a matrix source line and a gate connected to a matrix gate line and a storage capacitor connected between a drain of the switch transistor and ground and configured to transmit a source data pulse from the matrix source line to the storage capacitor in response to an activation gate signal that is applied to the gate of the switch transistor and write a latch voltage at a latch output node;
   an inversion circuit supplied with a first power voltage and a second power voltage and connected to the latch output node for outputting a driving voltage at either the first power voltage or the second power voltage based on the latch voltage at the latch output node, and
   a shifter circuit comprising a cross-coupled pull-up formed by a second PMOS transistor and a third PMOS transistor and a differential pair formed by a second NMOS transistor and a third NMOS transistor, wherein the source of said second and third PMOS transistors are coupled to an operative voltage higher than the driving voltage outputted from the inversion circuit, wherein the gate of the second PMOS transistor and the drain of the third PMOS transistor are coupled to the drain of the third NMOS transistor to form a level-shifted output, wherein the gate of the third PMOS transistor and the drain of the second PMOS transistor are coupled to the drain of the second NMOS transistor, and wherein the sources of the second NMOS transistor and the third NMOS transistor are grounded and the gate of the second NMOS transistor is coupled to receive the driving voltage outputted from the inversion circuit and the gate of the third NMOS transistor is coupled to the latch output node of the latch circuit.

* * * * *